Figure 1:
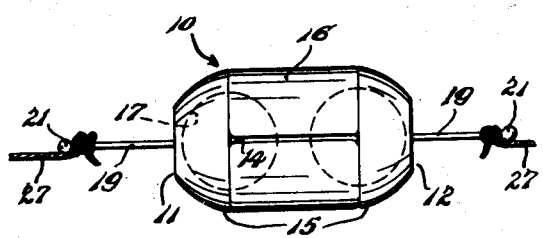

July 22, 1930.  C. O. KAHLE  1,771,125
COUPLING DEVICE
Filed Aug. 28, 1929

INVENTOR
Clay O. Kahle
BY
Edward E. Barnes
ATTORNEY

Patented July 22, 1930

1,771,125

UNITED STATES PATENT OFFICE

CLAY O. KAHLE, OF SEATTLE, WASHINGTON

COUPLING DEVICE

Application filed August 28, 1929. Serial No. 388,964.

This invention relates to coupling devices and has particular reference to apparatus of this character for securing a fishing line to the tackle.

The object of the invention, generally, is to provide a simplified efficient coupler for readily engaging fishing lines and tackle with advantages in the way of independent oscillatory motion not heretofore possible.

A specific object is the arrangement of novel means whereby an improved coupler is provided which may be readily assembled or dismantled in the facilitating of repairs, or in the desired use by an operator of selective various link assemblages.

With the foregoing and further objects and advantages in view, I provide an improved barrel housing construction accommodating a plurality of novel ball and associated link structures arranged for socketed use selectively therewith consisting in the novel construction, adaptation and combination of parts hereinafter described and claimed.

In the drawing,—

Figure 2:
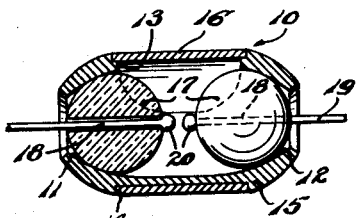
Figure 3:
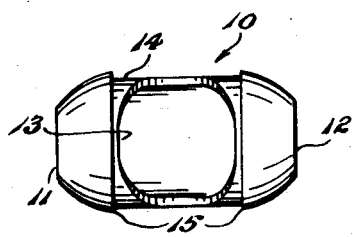
Figure 4:
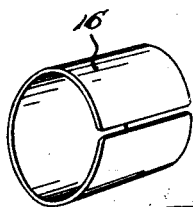
Figure 5:
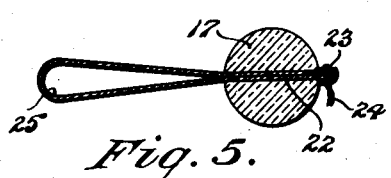
Figure 6:
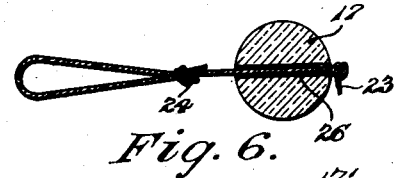
Figure 8:
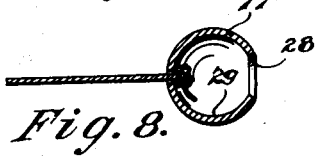
Figure 9:
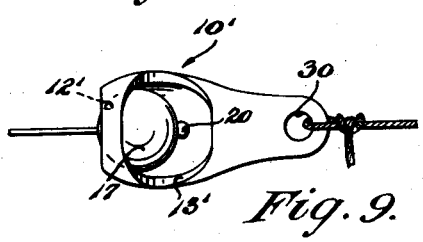

Figure 1 is a side elevation of the improved coupling, comprising the novel housing illustrating one form of ball and link; Fig. 2 is a longitudinal vertical section thereof; Fig. 3 is a detail plan of the housing, and Fig. 4 is a perspective of a spring clip closure. Figs. 5, 6, 7, and 8 are detail sections, embodying a plurality of varying forms of ball and link structures; and Fig. 9 is a plan of a modified form of housing.

Reference being had thereto, the preferred form of housing comprises a barrel shaped sheath 10, being a cylindrical tube having the opposite ends thereof crimped convergingly into socket extremities 11, 12, and as illustrated, providing substantially midway of the length, an apertured slot opening 13.

The housing 10 is further formed with a circumferential groove 14, adaptably provided by peripheral flange portions 15 disposed adjacent the opposite ends, said grooves being adapted to have suitably sprung thereabouts, a metallic spring sleeve 16, in sealing engagement to the aforesaid aperture 13.

Inserted through said aperture for bearing engagement to respective end sockets 11, 12, are beads 17, which may be of glass and of preferably spherical ball shaped configuration. Axially projecting through said beads, in the form shown in Figs. 1 and 2, are the shanks 18 of rod shaped links 19, the extremities thereof being suitably expanded as by heat welding, into barb head abutments 20, 21 at respective ends.

In modified structure therefrom, (Figs. 5 and 6) I provide selective flexible looped cord link forms which may comprise either a two-strand shank 22 having the ends 23, 24 knotted interiorly of the barrel to present a loop 25 at the exposed end, or a single-strand shank 26, knotting the end 23, within the enclosed barrel and looping the end 24 exteriorly thereof.

Figure 7:
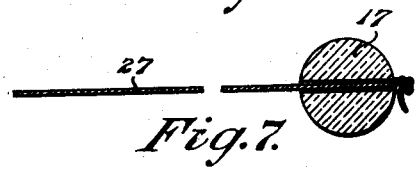

Fig. 7, illustrative of a further form of securement may comprise a fish line extremity 27 extending through the bead, the projecting end being knotted within the housing barrel enclosure. A hollow metallic ball $17^1$ is shown in Fig. 8, whereby the line is passed through diametrically oppositely disposed apertures, knotted, and redrawn through the larger opening 28 to bear against the inner peripheral wall 29 of the ball.

The plurality of structures described admits of an operator employing selectively, the desired form best seen to approximate the preferred stress.

A modified housing $10^1$ is indicated in Fig. 9, wherein a tube is crushed at one end and an annulet 30 struck therefrom, the opposite end being socketed, as at $12^1$ with the slot opening $13^1$ feeding thereto.

In operation, the spring clip or sleeve 16 is removed from the housing 10, and the preferred ball and link inserted through the aperture, to be disposed in socketed engagement to the barrel extremities. The sleeve 16 is sprung within the groove to enclose the apertured opening, the line and tackle being secured, as by a half-hitch, about respective exposed securing link portions.

If desirable, lubricants may be inserted within the barrel.

The structure presented provides an oscillatory swivel universal action between ball and socket members and supplemental rotative movement of the securing link shank within the ball.

While I have described and illustrated the preferred bead, it is evident that a cylindrical solid, hollow metallic or spherical ball, as well as numerous other similar structural formations might be readily inserted within suitable housing structure, and I do not wish to confine myself to embodiments as disclosed, except as hereinafter limited by the appended claims.

What I claim is,—

1. In a coupling device, the combination of a housing having an aperture in the wall and sockets at opposite ends thereof, a pair of spherical beads adapted to be inserted through said aperture into engagement with each of said sockets, links projecting axially through said beads for rotative movement therein, means to secure said links against dislodgment from said beads, annular flanges provided at opposite sides of said aperture on said housing, a spring clip encasing said housing between said flanges, and means provided by said links for securing ends of a complementary fishline and tackle thereto.

2. In a coupling device, a housing having an aperture in the wall and sockets at opposite ends thereof, spherical beads adapted to be inserted through said aperture into engagement with each of said sockets, links rotatably secured to said beads, means to seal said aperture, and means provided by said links for securing ends of a complementary fishline and tackle thereto.

3. In a coupling device, a housing providing an aperture in the wall and a socket in the end, said aperture being adapted to the reception therethrough of a bead for bearing engagement to said socket, means to seal said aperture, and means carried by said bead for securing the same with respect to a line.

4. In a coupling device, a housing providing an aperture and a socket, ball means insertable through said aperture for swivel engagement with respect to the socket, means to seal said aperture, and means to secure said ball means with respect to a line.

5. A device for coupling a fishline to the tackle comprising balls arranged for oscillatory movement within a socketed housing, line engaging means adapted for insertion diametrically through said balls for controlling said oscillatory movement, and means to secure said line engaging means against axial dislodgment from the balls.

6. In a coupling device, the combination of a socketed housing, means constituting a ball journaled for oscillatory swivel activity with respect to the socket of said housing, and line engaging means projecting diametrically through said ball, said line engaging means being adapted to a rotative acivity independently of the action of said ball.

7. A coupling device comprising a socketed housing, means journaled for oscillatory activity with respect to the socket of said housing, and line engaging means projecting diametrically through said socketed means and secured with respect thereto for controlling the oscillatory activity of the same.

Signed at Seattle, Washington, this 24th day of August, 1929.

CLAY O. KAHLE.